United States Patent [19]
Komatsu et al.

[11] Patent Number: 5,448,244
[45] Date of Patent: Sep. 5, 1995

[54] TIME-SHARING RADAR SYSTEM

[75] Inventors: Satoru Komatsu; Jun Ashihara, both of Tokyo, Japan

[73] Assignee: Honda Giken Kogyo Kabushiki Kaisha, Tokyo, Japan

[21] Appl. No.: 109,810

[22] Filed: Aug. 19, 1993

[30] Foreign Application Priority Data

Feb. 17, 1993 [JP] Japan .................................. 5-051443

[51] Int. Cl.$^6$ ......................... G01S 13/48; G01S 13/93
[52] U.S. Cl. ..................................... 342/155; 342/70; 342/147
[58] Field of Search ........................... 342/155, 147, 70

[56] References Cited

U.S. PATENT DOCUMENTS

| | | | |
|---|---|---|---|
| 3,495,246 | 2/1970 | Schonoborn | 342/147 X |
| 3,513,471 | 5/1970 | Mooney, Jr. et al. | 342/147 X |
| 4,110,754 | 8/1978 | Endo | 342/147 X |
| 4,180,814 | 12/1979 | Barton | 342/147 X |
| 4,771,288 | 9/1988 | Johnson | 342/147 X |
| 5,008,678 | 4/1991 | Herman | 342/158 |
| 5,045,856 | 9/1991 | Paoletti | 342/70 |
| 5,181,037 | 1/1993 | Komatsu | 342/70 |

*Primary Examiner*—Gilberto Barrón, Jr.
*Attorney, Agent, or Firm*—Lyon & Lyon

[57] ABSTRACT

A radar system and method for use in collision avoidance systems. A radar system in accordance with the present invention may comprise a plurality of antennas, an RF power generator, a transmitting unit, a receiving unit, and a direction detector. Each of the antennas is arranged to radiate a beam having substantially the same pattern as the beams radiated by the other antennas. The beam of each antenna is radiated in a slightly different direction from the beams radiated by the other antennas. Each antenna is also arranged to receive return beams, wherein each of the return beams comprises a beam radiated from one of the beam radiating means and reflected by an object. The RF power generator generates RF power of nearly constant amplitude. The transmitting unit distributes the RF power to each of the antennas, and the RF power is radiated successively. The receiving unit generates amplitude detecting signals which are used to detect the amplitudes of the return beams received by the antennas. Each of the amplitude detecting signals is utilized by a pair of antennas. One antenna of each pair radiates a beam and receives a return beam produced therefrom. The other antenna receives a return beam produced by a beam radiated by an adjacent antenna. The direction detecting means detects a direction to the object based on the amplitude detecting signals, the arrangement of the antennas, and a timing of distribution of FM signals to the antennas.

10 Claims, 4 Drawing Sheets

TIME-SHARING RADAR SYSTEM

BACKGROUND OF THE INVENTION

The present invention relates to radar systems and, in particular, to time-sharing radar systems and methods which are useful in alarm systems for detecting and avoiding potential automobile collisions.

A radar system, which is mounted on a vehicle such as an automobile and used in conjunction with an alarm system to detect and warn of potential frontal and rearend collisions, can be implemented using either a pulse radar system or an FM radar system. However, it has been recognized that FM radar systems are preferred over pulse radar systems because it is necessary for radar systems used in collision warning systems to have a minimum range of several decimeters. In FM radar systems, a frequency modulated (FM) signal having a frequency varying with time (and preferably varying linearly with time) is generated. In such systems, the generated FM signal is divided into two parts. One part is radiated from an antenna while the other part is supplied to one input terminal of a mixer as a local FM signal. The beam radiated from the antenna, if reflected by an object or target, will produce a return beam. The return beam may then be received by either the same or a different antenna and supplied to another input terminal of the mixer for mixing with the local FM signal. The mixer, in turn, will produce a beat signal having a frequency corresponding to the phase shift or time lag existing between the two signals supplied to its input terminals. The time lag is equal to the propagation time required for the radiated beam to travel to and return from the target. Thus, the lag time is proportional to the range to the target, and the range to the target can be calculated using the frequency of the beat signal.

To avoid interference from microwave transmission systems already in existence, it is presently preferred to use beams having a frequency higher than 30 GHz (i.e., beams having a wave length on the order of one millimeter:mm wave), which are rapidly attenuated upon propagation. This is so because the longest range to be detected is about several hundred meters. Beams having a frequency of about 60 GHz are exemplary.

FM radar systems are also preferred over pulse radar systems because a plurality of FM transceivers may be set to detect a direction to the target in addition to the range to the target. In such systems, a plurality of antennas are used and arranged to radiate beams having substantially the same pattern (or directivity) in slightly different directions from one another. In summary, FM signals of substantially equal amplitude are supplied to the antennas, beams of substantially the same amplitude are radiated by the antennas, and return beams are received by the same or other antennas. The direction to the target is calculated by processing ratio(s) of the amplitudes of the return beams. In systems of this type, there are two ways to avoid interference between the transceivers. One way is to allocate FM signals of different frequencies to each of the transceivers, and the other is to distribute FM signals of the same frequency to each of transceivers at different times. The latter method is referred to in the art as the time-sharing method, and the former is referred to in the art as the frequency-sharing method. The time-sharing method is generally preferred over the frequency-sharing method because the time-sharing method requires a reduced frequency range.

With regard to the issue of how to implement each of the transceivers, there are two ways. One way is to use a dedicated transmitting antenna and a separate dedicated receiving antenna. The other way is to use a single antenna, which is used both for transmitting and receiving (transceiving). In the latter case, a radiated FM signal beam and a received return beam are separated from each other using a circulator. The latter system, commonly referred to as a transceiving common antenna system, is presently preferred over the former system, which is commonly referred to as a dedicated antenna system, because the number of antennas required is reduced by one-half. This reduces the size and manufacturing cost of the overall system.

The use of transceiving antennas is especially important in FM radar systems wherein a relatively large number of antennas are required to detect a direction to a target in addition to a range to the target. Exemplary time-sharing/transceiving common antenna systems, which use mm wave FM signals, are disclosed in Japanese Patent Application HEI 2-303810, Japanese Patent Application HEI 3-42979, and U.S. Pat. No. 5,181,037.

In the prior art FM radar systems described above, a large number of antennas are required when it is desired to increase both the angular range of detection and the accuracy of such systems. As explained more fully below, this results in an increase in the size and manufacturing cost of the overall system.

The function of the prior art FM radar systems described above may be summarized as follows. For example, FIG. 4 illustrates the function of an FM radar system in which four beams Ba, Bb, Bc, and Bd, as shown in FIG. 4, are radiated from each of four transceiving common antennas A, B, C, and D (not shown in the Figure) respectively. The antennas A-D have the same radiation and receiving pattern (directivity), and the antennas A-D are arranged to radiate beams Ba-Bd in slightly different directions respectively. Further, assuming a target of a given size and position is shown as circle 100 in the figure, the amplitude of the return beam radiated and received by antenna B (Lb) (i.e., the return beam produced by radiated and reflected beam Bb) will exceed the amplitude of the other return beams. The amplitude of the return beam radiated and received by antenna A (La) (i.e., the return beam produced by radiated beam Ba) should be second highest. Finally, the amplitude levels of the return beams radiated and received by antenna C and D respectively (Lc, Ld) may both be zero. A direction to the target may be calculated using amplitudes La and Lb and the directions of antennas A and B.

To increase accuracy in a system of the type described above, it is desirable to increase the number of return beams having a non-zero amplitude. This is realized easily by reducing the difference of direction between adjacent beams ($\delta\theta$) (for example, by reducing the setting angles between antennas). In this fashion, the amplitude level of return beam Lc radiated and received by antenna C may be converted to a non-zero value. Assuming that the directions of antennas A, B, and C are $\theta a$, $\theta b$, and $\theta c$ respectively, then a direction to the target $\theta$ can be calculated as follows.

$$\theta = (La \cdot \theta a + Lb \cdot \theta b + Lc \cdot \theta c)/(La + Lb + Lc)$$

In this way, a direction to a target can be detected more accurately. However, the reduction of setting angles between the antennas leads to a reduction in the angular range of detection of the system. Accordingly, an increased number of antennas are required to increase both the accuracy and the angular range of detection of the system. This results in an increase in the size and manufacturing cost of the overall system.

SUMMARY OF THE INVENTION

In light of the above, it is an object of the present invention to provide a time-sharing radar system in which a direction to a target can be detected accurately by using a relatively small number of antennas. It is a further object of the invention to reduce the size of such a system and the cost required to manufacture such a system.

Another object of the present invention is to provide a time-sharing radar system in which noise caused by the reception of undesired beams by the system and can be effectively reduced.

Still another object of the present invention is to provide a time-sharing FM radar system in which beams of electromagnetic waves in a frequency range higher than 30 GHz (mm waves) are radiated and received to detect a direction and range to a target.

These and other objects of the present invention may be achieved using a time-sharing radar system of the type disclosed and claimed herein for measuring at least a direction to a target. An exemplary FM radar system in accordance with the present invention comprises a plurality of antennas, an RF power generating means, a transmitting unit, a receiving unit, and a direction detecting means. Each of the antennas is arranged to radiate a beam having substantially the same pattern or directivity as the beams radiated by the other antennas. The beam of each antenna is radiated in a slightly different direction from the beams radiated by the other antennas. Each antenna is also arranged to receive return beams, wherein each of the return beams comprises a beam radiated from one of the beam radiating means and reflected by an object. The RF power generating means generates RF power of nearly constant amplitude. The transmitting unit distributes the RF power to each of the antennas, and the RF power is radiated successively. The receiving unit generates amplitude detecting signals which are used to detect the amplitudes of the return beams received by the antennas. Each of the amplitude detecting signals is utilized by a pair of antennas. One antenna of each pair radiates a beam and receives a return beam produced therefrom. The other antenna receives a return beam produced by a beam radiated from another antenna. The direction detecting means detects a direction to the object based on the amplitude detecting signals, the arrangement of the antennas, and a timing of distribution of FM signals to the antennas.

According to the time-sharing radar system of the present invention, beams of substantially equal powers and radiation patterns are radiated from antennas at different times and in slightly different directions so as to partially overlap each other in space. For instance, as shown in FIG. 4, four beams Ba-Bd partially overlapping each other in space are radiated from antennas A-D (not shown). The receiving unit generates amplitude detecting signals which are used to detect the amplitudes of the return beams received by each of the antennas A-D. In the present invention, the antenna A, B, C, or D which radiates a beam Ba, Bb, Bc, or Bd, as the case may be, will not necessarily be the antenna A, B, C, or D which receives the return beam produced by the radiated beam Ba, Bb, Bc or Bd. Moreover, each of antennas A-D is capable of receiving return beams produced by beams radiated by other antennas.

For example, in the case of FIG. 4, the receiving unit generates amplitude level detecting signals for detecting Laa, Lab, Lbb, Lac, etc. Here, Laa is an amplitude level of a return beam which was produced by radiation from antenna A, reflection by the target, and reception by the same antenna A. Lab is an amplitude level of a return beam which was caused by radiation from antenna A, reflection by the target, and reception by the adjacent antenna B. Lbb is an amplitude level of a return beam which was caused by radiation from antenna B, reflection by the target, and reception by the same antenna B. Lbc is an amplitude level of a return beam produced by radiation from antenna B, reflection by the target, and reception by the adjacent antenna C, and so on.

Referring to FIG. 4, it can be understood that the amplitude level of return beam Lab is equal to an amplitude level of a virtual return beam which might be produced by radiation from a virtual antenna located at the center of antennas A and B, having a virtual directivity Bab, reflection by the target, and reception by that virtual antenna. The virtual directivity Bab comprises an overlapping area between the directivities or radiation patterns of antenna A (Ba) and antenna B (Bb) because the directivity of antenna B is the same during both radiation and reception.

It will be appreciated that the present invention provides a means for minimizing the number of antennas necessary to achieve a given level of accuracy without compromising the angular range of detection of an overall system. As an example, it will be noted that antennas A and B may be used to achieve the same accuracy as a system comprising antennas A, B and a third antenna disposed between antennas A and B. Moreover, using antenna B to receive return beams produced by a beam initially radiated by antenna A and reflected by a target provides the same advantages as using a third antenna disposed between antennas A and B for both radiating and receiving a return beam. The same relationship applies between antennas B, C and D in FIG. 4. As a result, the same detectable angular range and high accuracy which may be achieved by using seven antennas in a prior art system can be achieved by using only four antennas in a system in accordance with the present invention.

DETAILED DESCRIPTION OF THE PREFERRED EMBODIMENTS

Figure 1:
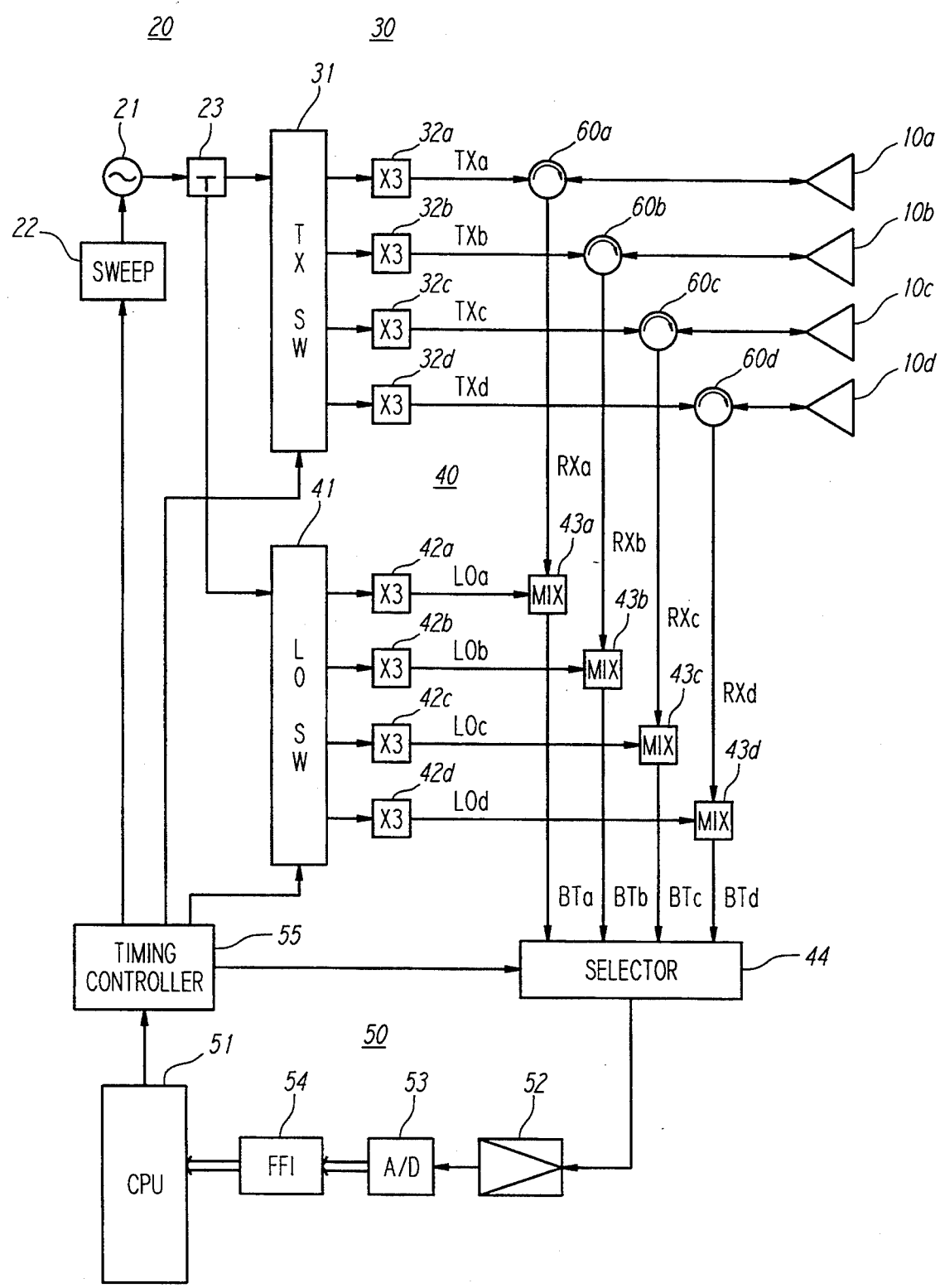
FIG. 1 is a block diagram of a time-sharing FM radar system according to one embodiment of the present invention.

FIG. 1 shows a block diagram of a time-sharing FM radar system according to one embodiment of the present invention. The time-sharing FM radar system shown in FIG. 1 includes four antennas 10a–10d, an FM signal generator 20, a transmitting unit 30, a receiving unit 40, a detection and control unit 50, and circulators 60a–60d. The four antennas 10a–10d are set to radiate partially overlapping beams having substantially the same radiation patterns. Antennas 10a–10d may be implemented using an Offset-Defocus-Plaboric-Multibeam antenna comprising a common parabolic reflector and four radiators which are disposed in the vicinity of the focus of the reflector, and which are set in slightly different orientations to the reflector. Antennas 10a–10d can be implemented using planar microstrip antennas. The FM signal generator 20 comprises a voltage controlled oscillator (VCO) 21, which generates a microwave FM signal, and a sweep circuit 22, which supplies a modulation voltage in a triangle wave form to the VCO 21 and power divider 23. The transmitting unit 30 comprises a transmitting switching circuit 31 and four triple frequency multipliers 32a–32d. The receiving unit 40 comprises a local switching circuit 41, four triple frequency multipliers 42a–42d, four mixers 43a–43d, and a beat signal selector 44. The detection and control unit 50 comprises a CPU 51, an amplifier 52, an A/D converter 54, a fast fourrier transformer (FFT) 54, and a timing controller 55.

Figure 2A:
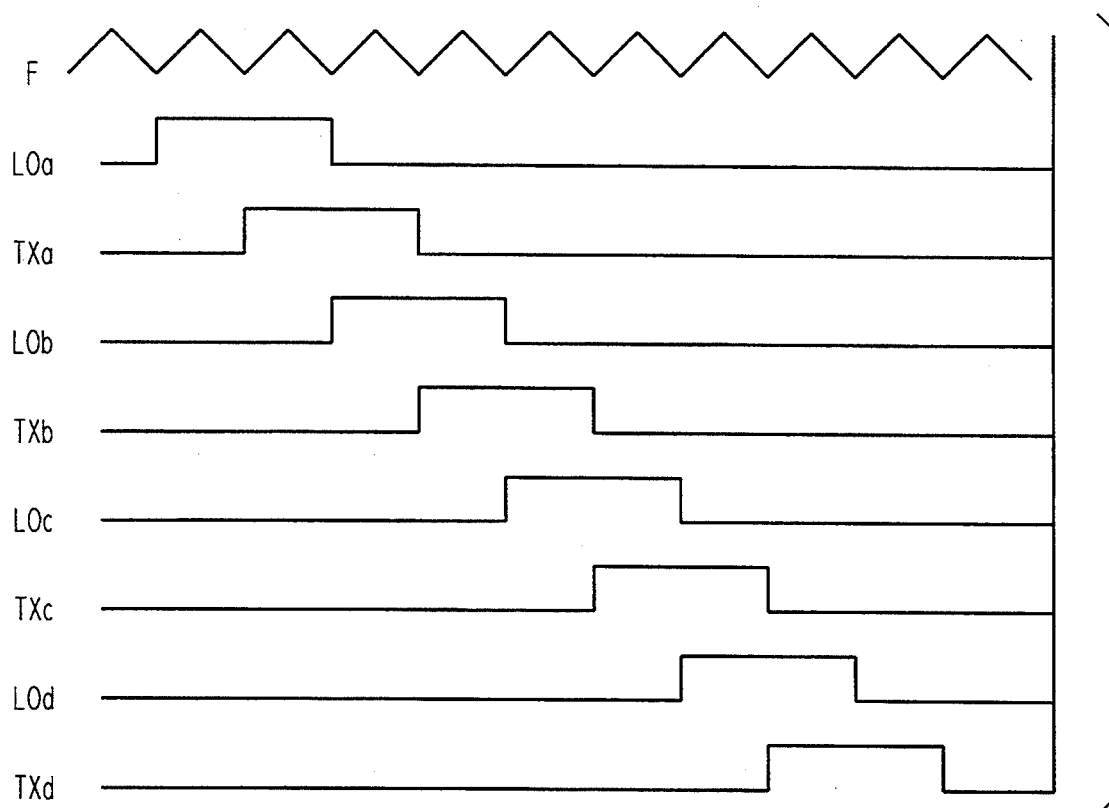
FIGS. 2(a) and 2(b) are timing charts illustrating one example of operation of the embodiment shown in FIG. 1.

Turning now also to FIG. 2(a), the FM signal generator 20 generates a microwave FM signal F having a frequency which increases and decreases linearly around 20 GHz within a predetermined period. The power level of the microwave FM signal is kept constant. The FM signal is divided into two parts of nearly equal power level by the power divider 23. The two parts are supplied to the transmitting unit 30 and the receiving unit 40 respectively. In the transmitting unit 30, the FM signal is separated by the transmitting switching circuit 31 into four parts of different timing or time period. The four parts are distributed successively and repeatedly to each of four triple frequency multipliers 42a–42d. The frequency multipliers 42a–42d convert the signals delivered thereto to mm wave FM signals in the frequency range above 30 GHz (for instance, about 60 GHz). These mm wave FM signals are supplied through circulators 60a–60d to antennas 10a–10d, and are radiated from each of the antennas 10a–10d successively, as shown as TXa–TXd in the timing charts of FIG. 2(a). In these timing charts, periods in which corresponding beams exist are shown by high states.

The radiated beams TXa–TXd which are reflected by a target, produce return beams which are received by the antennas 10a–10d. The received return beams RXa–RXd are separated from the transmitting unit 30 using circulators 60a–60d and are supplied respectively to one input terminal of each of the mixers 43a–43d. The mixers 43a–43d are set in the receiving unit 40 corresponding to each of the antennas 10a–10d. The mm wave local signals LOa–LOd are supplied to another input terminal of the mixers 43a–43d.

The local signals LOa–LOd are generated by the triple frequency multipliers 42a–42d by multiplying microwave FM signals which are supplied from the FM signal generator 20 and divided into four different time periods successively and repeatedly by the local switching circuit 41 which operates under predetermined timing. Each of the local signals LOa–LOd is distributed to one of the mixers 43a–43d successively and repeatedly. As shown in the timing charts of FIG. 2(a), each of the local signals LOa–LOd is supplied to mixers 43a–43d and is interpolated between two time periods in which two beams are successively radiated from adjacent antennas. One of the antennas is the antenna to which the mixer corresponds, and the other is the antenna adjacent to the antenna to which the mixer corresponds. Except in the case of the local signal LOa, each of the local signals LOa–LOd has partially the same periods in which two of the beams TXa–TXd are radiated. For example, the local signal LOb is supplied to mixer 43b during part of the period in which beam TXb is radiated from antenna 10b to which the mixer 43b corresponds. The local signal LOb is also supplied to mixer 43b during part of the period in which the beam TXa is radiated from the antenna 10a, the antenna adjacent to antenna 10b.

Figure 2B:
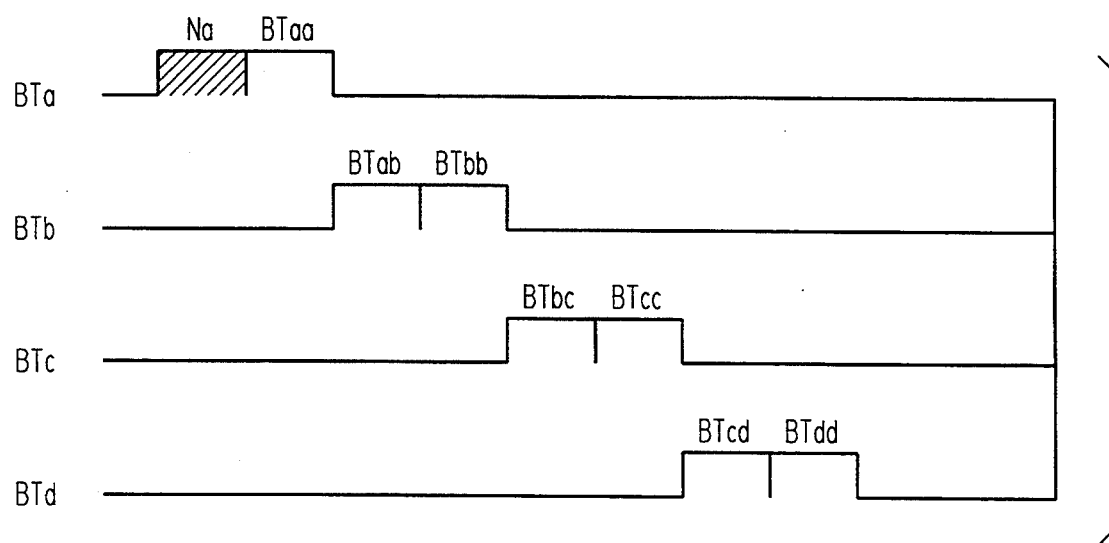

To simplify the present discussion, imagine a case in which a target exists in the vicinity of the time-sharing FM radar. In this case, the periods in which the return beams RXa–RXd are received by antennas 10a–10d are nearly the same as the periods in which beams TXa–TXd are radiated from the antennas 10a–10d. In this case, the periods shown by TXa–TXd in FIG. 2(a) can be regarded as the periods in which return beams RXa–RXd are received. Accordingly, beat signals BTa–BTd as shown in FIG. 2(b), are produced in the mixers 43a–43d in the periods in which two of TXa–TXd and one of LOa–LOd are both in high states.

Signal Na which appears preceding the beat signal BTaa is a signal which is output from the mixer 43a in a period in which the local signal LOa is supplied to the mixer 43a but none of the beams TXa–TXd is radiated from the antennas 10a–10d. Accordingly, the signal Na comprises a beat signal generated in the mixer 43a by mixing the local signal LOa, an undesired incoming beam received by the antenna 10a, and noise generated in the mixer 43a. On the other hand, the signal BTaa which appears following the signal Na is a signal output from mixer 43a in a period in which the local signal LOa is supplied to the mixer 43a and the beam TXa is radiated from the antennas 10a. Accordingly, the signal BTaa is a beat signal generated in the mixer 43a by mixing the local signal LOa and return beam received by antenna 10a. The return beam is caused by radiation of beam TXa from antenna 10a itself and reflection by a target.

Figure 4:
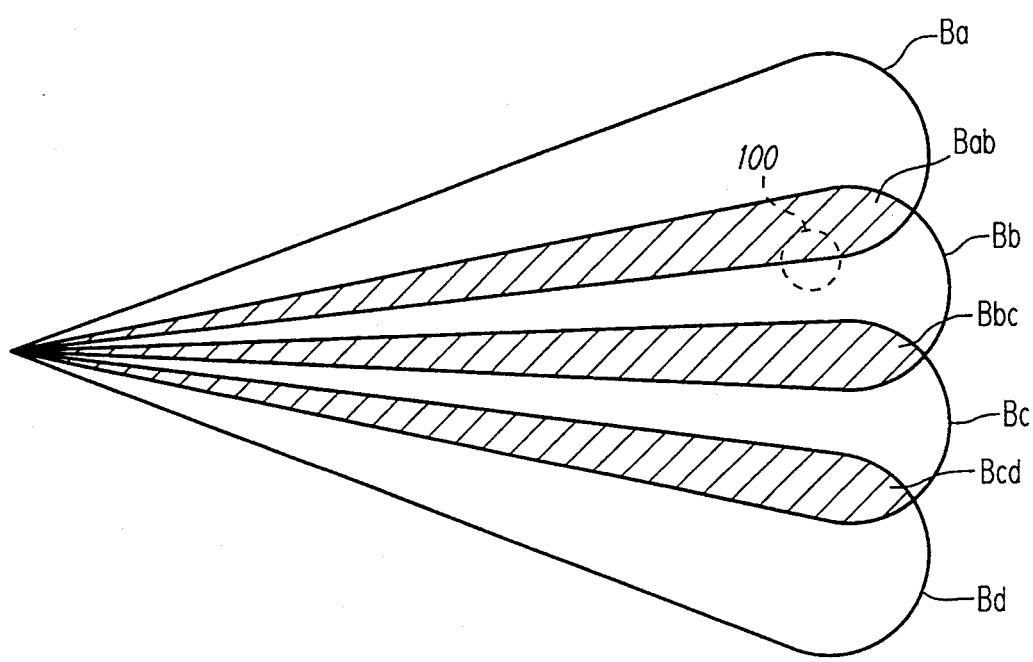
FIG. 4 is a schematic view illustrating the principles underlying the operation of a radar system for detecting a direction to a target in accordance with the present invention.

The preceding part BTab of the beat signal BTb is a signal which is output from the mixer 43b in a period in which the local signal LOb is supplied to the mixer 43b, and the beam TXa is radiated from the antennas 10a. Accordingly, the signal BTab is a beat signal generated in the mixer 43b by mixing the local signal LOb and return beam received by antenna 10b adjacent to the antenna 10a which radiated the beam TXa to cause the return beam. The amplitude level of the beat signal BTab is equal to the amplitude level of a virtual return beam which could be produced by radiation from a virtual antenna located at the center of antennas A and B and having a virtual directivity Bab shown in FIG. 4, and reflection by the target and reception by that virtual antenna. Further, the succeeding part BTbb of the beat signal BTb is a signal which is output from the mixer 43b in a period in which the local signal LOb is supplied to the mixer 43b and the beam TXb is radiated from the antennas 10b. Accordingly, the signal BTbb is a beat signal caused by return beam received by antenna 10b which radiated the beam TXb to cause the return beam.

Similarly, the preceding part BTbc of the beat signal BTc is a beat signal caused by radiation from antenna 10b and reception of return beam by antenna 10c, and a succeeding part BTcc of the beat signal BTc is a beat signal caused by radiation from antenna 10c and reception of a return beam by the same antenna 10c. Also, a preceding part BTcd of the beat signal BTd is a beat signal caused by radiation from antenna 10c and reception of return beam by antenna 10d. A succeeding part RTdd of the beat signal RTd is a beat signal caused by radiation from antenna 10d and reception of return beam by the same antenna 10d.

The beat signals BTa–BTd which are output from mixers 43a–43d successively are selected by the beat signal selector 44 operating under the control of a timing signal supplied from timing-control circuit 55, and are supplied to the detection and control unit 50 successively. The beat signals BTa–BTd which are supplied to the detection and control unit 50 are amplified by the amplifier 52, then converted to digital signals by A/D converter 53, and finally converted to frequency spectra by FFT 54 to be supplied to the CPU 51. In the CPU 51, seven frequencies faa, fab, fbb . . . fdd of seven components of the beat signals BTaa, BTab, BTbb . . . BTdd are processed under appropriate statistical procedure (for example, averaged) to provide a final beat frequency. From the final beat frequency, the time interval required for a radiated FM beam to propagate to the target is calculated; then from the calculated time interval a range to the target is calculated.

In addition, the CPU 51 selects, from among seven amplitude levels Laa, Lab, Lbb . . . Ldd of seven components of the beat signals BTaa, BTab, BTbb . . . BTdd, those signals which have an amplitude larger than a predetermined threshold value which is set to eliminate noise. The selected amplitude levels of the beat signals are used for weighting the direction of the corresponding antennas in calculating the average direction of the antennas. For instance, in the case in which three amplitude levels Laa, Lab and Lbb of beat signals BTaa, BTab and BTbb are selected, because they are larger than the threshold value, the direction to the target e is calculated as follows.

$$\theta = (Laa \cdot a + Lab \cdot \theta ab + Lbb \cdot \theta b)/(Laa + Lab + Lbb)$$

Here, ea and eb are the directions of antennas 10a and 10b respectively, and eab is the direction of the virtual antenna which is assumed to be arranged in the center of the antennas 10a and 10b. $\theta$ab is considered to satisfy following relation.

$$\theta ab = (\theta a + \theta b)/2$$

As mentioned above and shown in FIG. 2(b), the preceding part Na of the beat signal BTa comprises the beat signal caused by an undesired incoming beam received by the antenna 10a and noise generated in the mixer 43a. If desired, the frequency spectrum of this noise may be stored in the CPU 51 for subtracting from the frequency spectra obtained from real beat signals at a later time, to eliminate the noise which is also included in the real beat signals. This technique is useful if the incoming noise is also included in all beat signals and noise generated in the mixers 43b–43d is the same as that generated in the mixer 10a.

Figure 3:
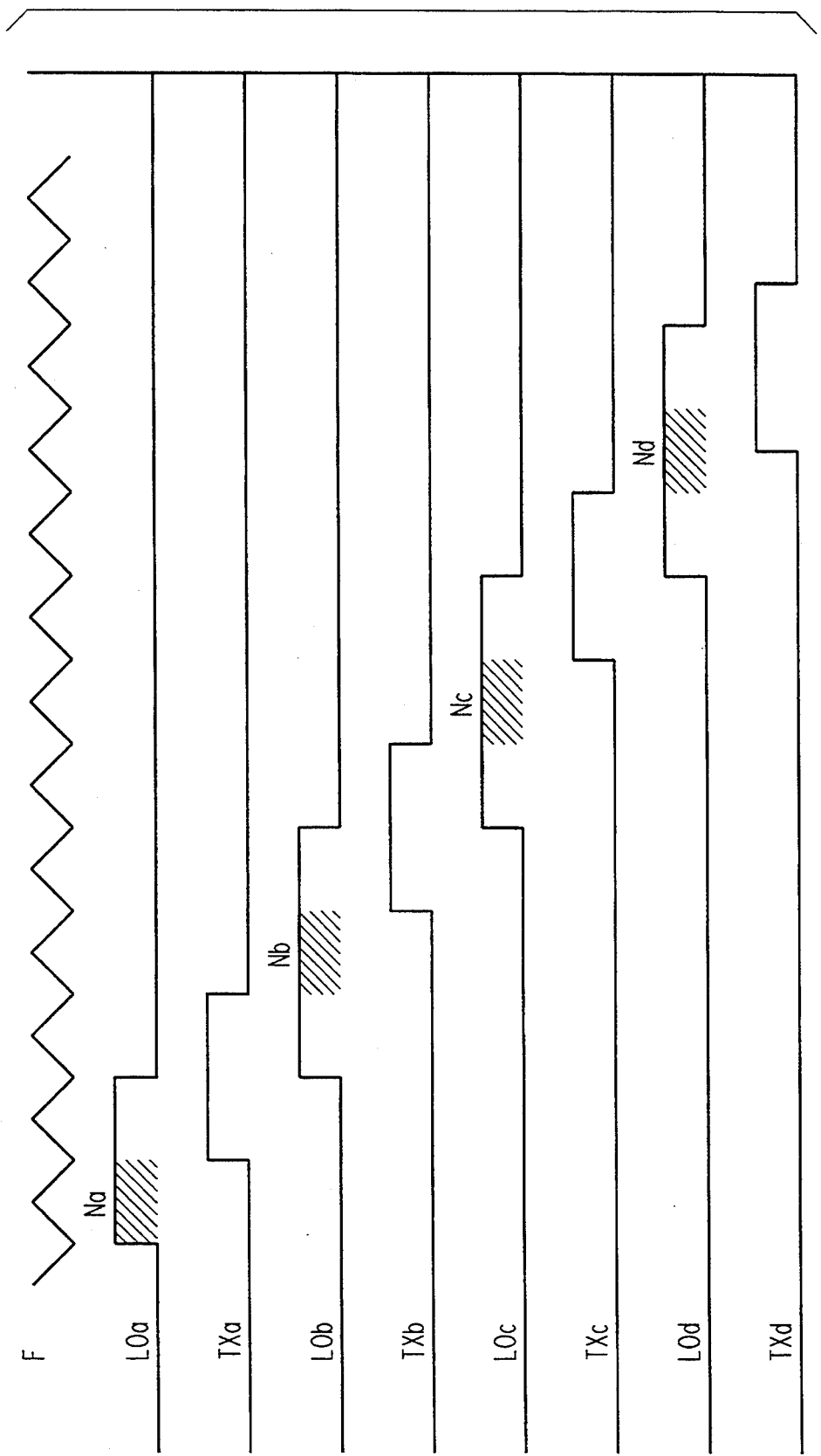
FIG. 3 is a timing chart illustrating another example of operation of the embodiment shown in FIG. 1.

Another example of timing is shown in FIG. 3. In this example, the period in which only local signal LOa is supplied to mixer 43a for detection and noise elimination is expanded to other local signals LOb–LOd and corresponding mixers 43b–43d. Although the beat signals are not shown explicitly in FIG. 3, the period Na is a period in which only local signal LOa is supplied to mixer 43a for detecting noise which comprises incoming noise received by antenna 10a and internal noise generated in the mixer 43a. Period Nb is a period in which only local signal LOb is supplied to mixer 43b for detecting noise which comprises incoming noise received by antenna 10b and internal noise generated in the mixer 43b. Similarly, the signals generated during periods Nc and Nd comprise incoming noise received respectively by antennas 10c and 10d and internal noise generated in mixers 43c and 43d, respectively. The noise detected in each period is stored in memory by the CPU 51, and may be used to filter noise from the detected beat signals.

While the invention has been described in detail and with reference to specific embodiments thereof, it will be apparent to those skilled in the art that various changes and modifications, such as those described below, may be made to the invention without departing from the spirit and scope of the invention, as defined by the appended claims.

An example is described in which antennas are set to radiate only two overlapping beams from the most adjacent two antennas. However, the antennas could be set to overlap three or more beams radiated from three or more antennas.

Although an example is described in which four antennas are utilized, antennas of appropriate different numbers, for instance, two or three or five antennas may be used. Moreover, the application of the invention, as disclosed and claimed herein, is not considered to be limited by the number of antenna used.

Further, an example is described in which only FM signals are radiated from the antennas. However, another function for detecting relative speed to a target could be added by adding a period to radiate a beam of constant frequency, and by adding the function of detecting the Doppler shift frequency.

Still further, although an example is described in which homodyne detection is used, heterodyne detection may also be used.

Finally, although an FM radar system is described, the principle for detecting a direction to a target included in the present invention can be applied to pulse radar systems which radiate and receive not only electromagnetic beam, but also light beam.

What is claimed:

1. A time-sharing radar system comprising:
    a plurality of beam radiating and receiving means, each being arranged to radiate a beam having a selected pattern or directivity in a direction slightly different from the beams radiated by the other beam radiating and receiving means, and each being arranged to receive return beams, each of said return beams comprising a beam radiated from one of said radiating and receiving means and reflected by an object;
    a signal generating means for generating signals of nearly constant amplitude;

a timing control means for controlling when said beams are radiated from said beam radiating and receiving means, said beams being radiated from said beam radiating and receiving means successively;

a receiving unit for generating amplitude detecting signals to be used to detect amplitude levels of said return beams received by said beam radiating and receiving means, one group of said level detecting signals being generated from return beams resulting from radiation from one of said beam radiating and receiving means, reflection by said object, and reception by the same radiating and receiving means, and another group of said level detecting signals being generated from return beams resulting from radiation from one of said beam radiating and receiving means, reflection by said object, and reception by an adjacent radiating and receiving means; and a direction detecting means for detecting a direction to said object based upon a weighted mean value of said amplitude level detecting signals, an arrangement of said beam radiating and receiving means, and a timing relationship existing between and among said signals distributed to said beam radiating and receiving means.

2. A time-sharing FM radar system according to claim 1 wherein:

said signal generating means comprises an FM signal generating means for generating an FM signal having a frequency varying periodically with time;

said timing control means comprises a transmitting unit for distributing said signals generated by said signal generating means to each of said beam radiating and receiving means for successive radiation;

said receiving unit including a plurality of mixers, each of said mixers being set to correspond to one of said beam radiating and receiving means, each of said mixers mixing a local FM signal and a signal indicative of one of said return beams received by said corresponding beam radiating and receiving means to produce a beat signal as one of said level detecting signals, said local FM signal being a non-radiated signal related to said FM signal distributed to said beam radiating and receiving means; and said receiving unit further including a range detecting means for detecting a range to said object based upon a frequency of at least one of said produced beat signals.

3. A time-sharing FM radar system according to claim 2 wherein:

said transmitting unit includes a transmitting switching circuit for distributing said FM signal generated by said FM signal generating means to each of said beam radiating and receiving means successively in accordance with an order of arrangement of said beam radiating and receiving means; and said receiving unit includes a local switching circuit for distributing said local FM signal to each of said mixers successively, such that said local FM signal is distributed to one of said mixers and has a partially common period with said FM signal distributed to said corresponding antenna and also has a partially common period with said FM signal(s) distributed to at least one other beam radiating and receiving means adjacent to said corresponding beam radiating and receiving means.

4. A time-sharing FM radar system according to claim 3 wherein:

said local FM signal is distributed to one of said mixers having a period partially uncommon to said FM signals distributed to said beam radiating and receiving means; and said receiving unit further includes a noise detecting means for detecting noise within a beat signal output from said mixer in said partially uncommon period.

5. A time-sharing FM radar system according to claim 4 wherein:

said receiving unit further includes a noise eliminating means for subtracting said detected noise from said beam signal output from said mixer in a partially common period.

6. A time-sharing radar system according to claim 1 wherein:

said signal generated by said signal generating means is a pulsive electromagnetic wave.

7. A time-sharing radar system comprising:

a plurality of antennas, each antenna being arranged to radiate a beam having a selected pattern in a direction slightly different from the beams radiated by the other antennas, and each antenna being arranged to receive return beams, each of said return beams comprising a beam radiated from one of said antennas and reflected by an object;

an FM signal generator for generating signals of nearly constant amplitude;

a timing control circuit for controlling a sequence of radiation of said beams from said antennas, said beams being radiated from said antennas successively;

a receiver capable of generating amplitude detecting signals to be used to detect an amplitude level of each return beam received by said antennas, one group of said amplitude level detecting signals serving to detect the amplitude of return beams resulting from radiation by one of said antennas, reflection by said object, and reception by the same antenna, and another group of said amplitude level detecting signals serving to detect the amplitude of return beams resulting from radiation from one of said antennas, reflection by said object, and reception by an adjacent antenna; and a direction detecting means for detecting a direction to said object based upon a weighted mean value of said detected amplitude levels of said return beams, an arrangement of said antennas, and a timing relationship existing between and among the signals distributed to said antennas.

8. A method for achieving improved accuracy in detecting a direction to an object, said method being for use in a radar system for use in collision avoidance systems, said radar system having a fixed number of antennas, each antenna being arranged to radiate a beam having a selected pattern in a direction slightly different from the beams radiated by the other antennas, and said method comprising the steps of:

generating a plurality of FM signals having substantially similar amplitudes;

sequentially providing said FM signals to each of said antennas for radiation;

allowing a first beam to be radiated by a selected antenna, reflected by said object, and received by said selected antenna, said beam received by said selected antenna comprising a first return beam;

allowing a second beam to be radiated by said selected antenna, reflected by an object, and received by an antenna adjacent said selected antenna, said beam received by said selected antenna comprising a second return beam;

detecting an amplitude level of each of said return beams; and determining a direction to said object based at least in part upon a weighted average of said amplitude levels of said return beams.

9. A method for achieving improved accuracy in radar systems used in collision avoidance systems, said method comprising the steps of:

detecting an amplitude level of each of a plurality of return beams received by a selected number of antennas; and determining a direction to an object based at least in part upon a weighted average of said amplitude levels of said return beams.

10. The method of claim 9 wherein said step of determining a direction further includes detecting which of said amplitude levels exceeds a threshold value and using a sum of those amplitude levels which exceed said threshold as a denominator value when computing said weighted average.

* * * * *